United States Patent [19]
Taube

[11] Patent Number: 5,813,513
[45] Date of Patent: Sep. 29, 1998

[54] CONVEYOR APPARATUS

[75] Inventor: William L. Taube, North Canton, Ohio

[73] Assignee: Redicon Corporation, Canton, Ohio

[21] Appl. No.: 578,041

[22] Filed: Dec. 26, 1995

[51] Int. Cl.⁶ .................................................. B65G 17/36
[52] U.S. Cl. ........................ 198/803.14; 198/841; 72/361
[58] Field of Search .................. 198/803.14, 803.15, 198/841; 72/361

[56] References Cited

U.S. PATENT DOCUMENTS

| | | | |
|---|---|---|---|
| 2,239,076 | 4/1941 | Biedess | 198/841 |
| 3,231,065 | 1/1966 | Kaminski et al. | 198/131 |
| 3,368,383 | 2/1968 | Marszal | 72/361 |
| 3,812,953 | 5/1974 | Maschke | 198/131 |
| 4,289,231 | 9/1981 | Kaminski | 198/834 |
| 4,588,066 | 5/1986 | Kaminski | 198/345 |
| 5,025,916 | 6/1991 | Kaminski | 198/803.15 |
| 5,119,924 | 6/1992 | Kaminski | 198/803.15 |

*Primary Examiner*—Joseph E. Valenza
*Attorney, Agent, or Firm*—Reese Taylor

[57] ABSTRACT

An endless conveyor belt for moving and transferring articles includes a series of through apertures which have a stepped configuration either created by cutting the aperture to a first size for a portion of its depth and a different size for the remainder thereof or by providing inserts for the apertures which have a stepped configuration. The belt may be driven by a rotating drum and supported by at least one leaf spring disposed in opposed relationship with the drum and adjustable toward and away from the drum to adjust tension on the belt. The belt may also be supported by a series of spring loaded plates which can be adjusted to vary the elevation of the belt.

11 Claims, 9 Drawing Sheets

CONVEYOR APPARATUS

RELATED PATENT APPLICATIONS

None.

FIELD OF THE INVENTION

This invention relates in general to an apparatus for transferring objects and relates in particular to an improved conveyor apparatus for transferring container end panels or shells during a metal forming operation.

BACKGROUND OF THE INVENTION

In the packaging industry it is well known that the two-piece beverage or food container has gained wide acceptance. These containers generally consist of a container body, which is a cylindrical member having a closed bottom and open top, and a shell or end which is seamed to that top. Such container bodies and ends are normally formed from blanks cut from coil or sheet stock and then drawn, redrawn, ironed, etc., into their final configuration. These containers have found wide commercial acceptance and avoid many of the problems associated with the older three-piece container which consists of a top, bottom and welded body.

Since the introduction of the metal beverage can, the industry has been working diligently to improve its performance characteristics and to achieve economy. The move to the two-piece container is one of the improvements which have been made. Additionally, the material from which the containers are formed has moved from a 0.0150 inch gauge to a 0.0085 inch gauge and the end structure itself has undergone various modifications, including the provision of integrated opening members on the ends, first with a rivet and removable tab and later with a more ecologically satisfactory opening feature wherein the tab is not removed from the can after opening.

Through all of this development, the principal objects have been to provide a user friendly can and/or shell while continually reducing the starting metal thickness for economic reasons. However, the continued reduction of the metal thickness has rendered these ends more and more fragile and difficult to handle during the forming operation without damage. Given the relatively fragile nature of these workpieces, they are particularly susceptible to damage when handled mechanically as they are transferred from station to station within the forming press. Furthermore, misalignment or mispositioning of ends, for example, such as when an end is presented to the tooling station in a deformed condition or when two ends are presented simultaneously, can result in tooling damage. Such an occurrence often requires time-consuming and expensive tool and die repair or replacement. Therefore, the handling and transfer of the ends during the forming process have become more and more important in the overall manufacturing process.

In the prior art, various improvements in feeding or transferring have accordingly been made. Some of these improvements can be seen in Kaminski U.S. Pat. No. 3,812,953 wherein a pocketed belt is utilized with the belt being fed over a driving drum and an idler drum. The pockets open through the belt material and the ends are deposited in the pockets as the belt is moved through the forming press and various forming operations are performed thereon at various stations. They are then transferred, in the pockets, on out of the forming apparatus, usually for further forming operations or for packaging. This approach is intended to minimize mechanical handling of the ends to reduce the likelihood of damage.

Further examples of similar transfer means can be seen in Kaminski U.S. Pat. Nos. 4,289,231; 4,588,066 and 5,025,916. While incorporating various refinements, all of these transfer means include the belt concept wherein the belt is fed over and driven around opposed idle and drive drums and wherein the belt has a series of through apertures therein for receipt of the ends.

While the apparatus disclosed in the patents just referred to are presumably adequate for the purposes for which they were intended, certain difficulties do arise in utilization thereof. For one thing, the belt tends to sag between the drums which form its point of support. That is, as the forming tooling comes down to engage the workpiece, the belt, which is carrying the piece, is depressed a certain amount. Thus, the belt must stretch to accommodate this movement inasmuch as the force required to move the mass of the idle drum, even if spring or air loaded, exceeds the capabilities of the belt. Also, the usual press may include a plurality of tooling stations and when the belt is depressed at one station, for example, the pitch line of the belt is necessarily disturbed, making it difficult to accurately align the workpieces at other stations. The only way to change tension to accommodate this movement would be to adjust the idler roll or drum inasmuch as it is important that the belt, and consequently the workpiece, be precisely positioned during forming. However, this cannot be done during operation.

Furthermore, the evolution of can end design has developed ends which have a greater height dimension than was previously the case. The greater the height dimension, the more the belt is required to move in a vertical direction during forming which only aggravates the stretching problem. That is, while a slight degree of belt movement may be tolerable, the specific distances involved are extremely small. For example, the height dimension of a typical finished end may be about 0.1588 inches. Thus, the belt need not be off line any substantial amount at all in order to cause alignment problems.

In many conveyor systems of this type, a solid metal surface must be provided beneath the belt to prevent the piece from dropping entirely through the belt aperture as it is deposited therein and to limit the belt movement.

In many cases also, a lip must be formed on the piece just to prevent it from dropping on through the aperture. For example, in conversion presses using a belt transfer, the piece is carried through the press by the lip of the piece resting on the top surface of the belt and the lateral location of the piece is achieved by the protrusion on the piece normally referred to as the countersink which projects into the belt aperture. However, provision of the lip interferes with subsequent forming operations.

Accordingly, it is believed desirable to provide a transfer belt arrangement wherein essentially automatic compensation is provided for the depression of the belt; movement of the belt is controlled by replacement of an underlying rigid surface with a spring loaded support; and wherein the belt pockets are formed so as to eliminate the necessity of forming a lip or flange on the article. Thus, it is desirable to provide a means for carrying parts through the press so that forming operations can be performed on a greater portion of the part and to produce such a belt system which is adjustable and easily changeable.

SUMMARY OF THE INVENTION

It has been found that the disadvantages of a conventional pocketed belt transfer can be reduced by providing an endless belt with a driving drum at one end and a sliding shoe comprising a leaf spring at the other. In that fashion, the sag in the belt created during forming can be compensated for without having to adjust the usual idler roll. Thus, the leaf will maintain the belt at its desired level in an idle condition but will accommodate some deflection of the belt during the forming operation due to its natural resiliency and low mass when compared to the usual idler and drive roll supporting arrangement.

It is also possible to utilize spring loaded elevating support plates disposed beneath the belt which are spaced apart so as to not interfere with the operation of the tooling, yet support the belt as desired during operation.

In that regard, the deeper shells now being contemplated result in an even greater amount of depression of the belt in the working area during forming and this degree of distortion is even more undesirable. It has been found that the utilization of plates beneath the belt which are vertically movable makes it possible to actually elevate the belt above the horizontal in the idle position. Such an arrangement eliminates or at least minimizes belt stretching in normal operation inasmuch as the total movement of the belt may be greater due to the increased depth of the part, but the movement below the horizontal is about the same.

Finally, it has been found that the pockets in the belt can be improved to avoid the need to provide support beneath the pockets or to provide a lip or flange about the top of the end. Thus, a two level or stepped pocket can be provided so that a shelf for receipt of the curling hook is provided and there is no need to form the end with a lip or flange merely for support purposes.

Accordingly, production of an improved transfer belt system becomes the principal object of this invention with other objects thereof becoming more apparent when considered and interpreted in view of the accompanying drawings.

BRIEF DESCRIPTION OF THE PREFERRED EMBODIMENTS

Figure 1:
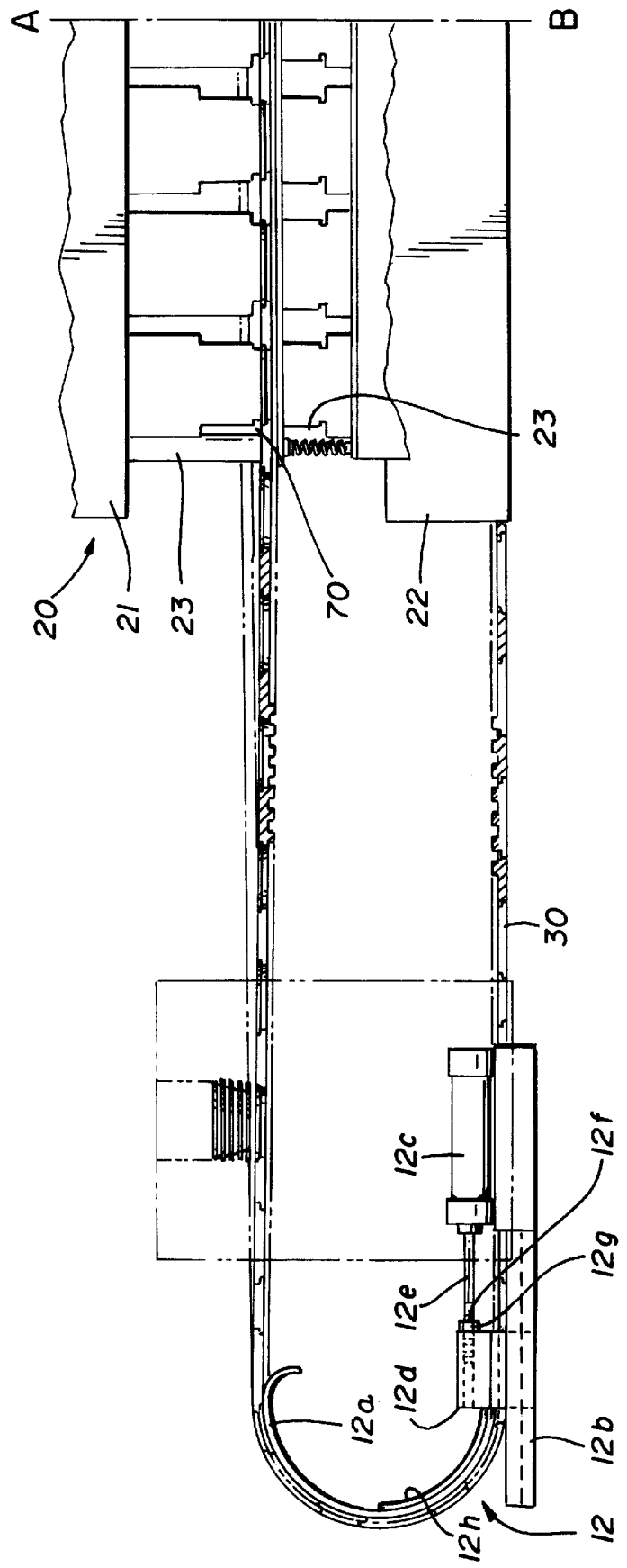
FIGS. 1 and 1A are a side elevational view of one form of the invention.
Figure 1A:
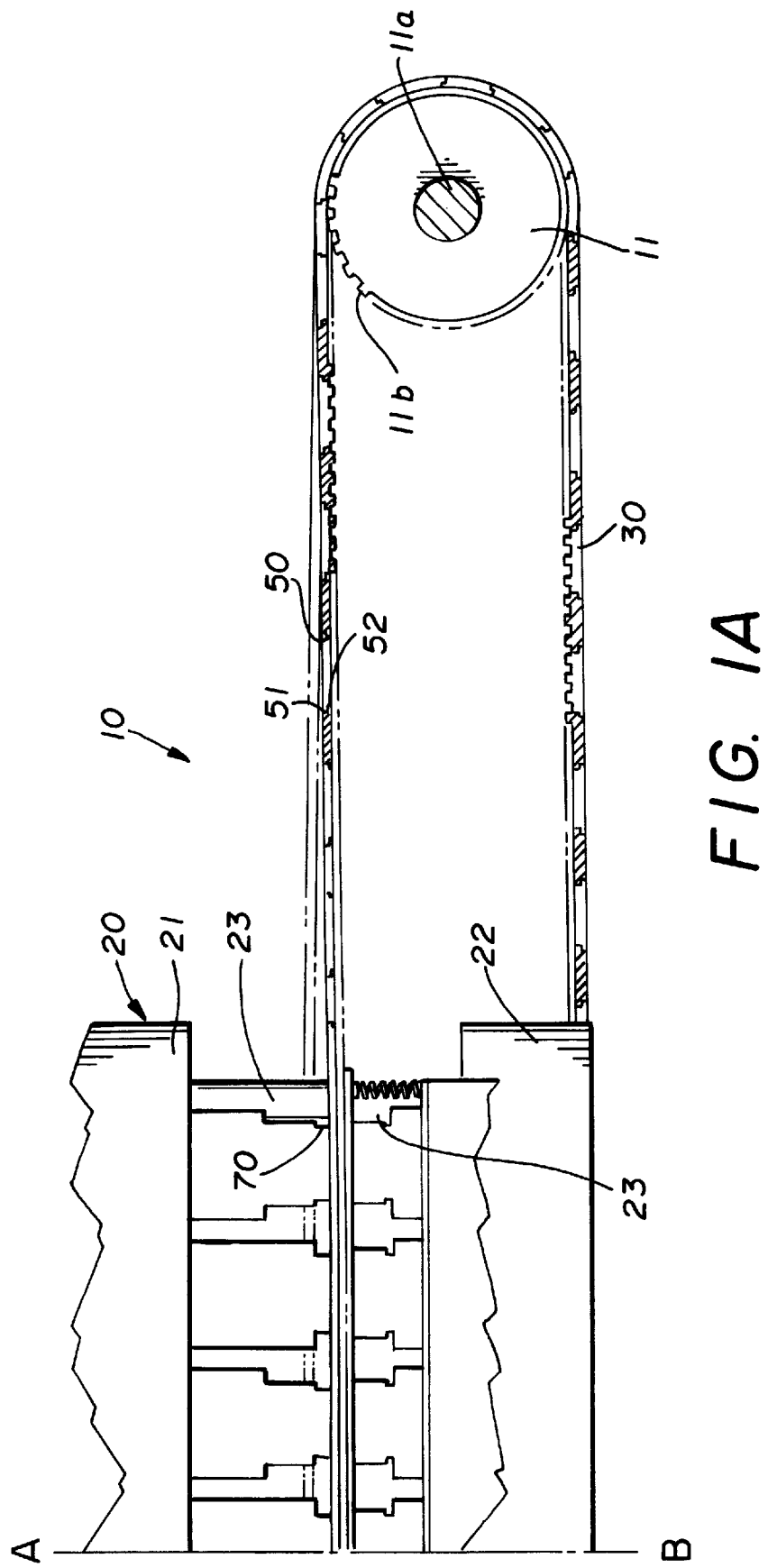

Referring first then to FIGS. 1 and 1A of the drawings, it will be seen that the improved system, generally indicated by the numeral 10, includes a press 20 having an upper platen 21 and a lower platen 22 and various tooling members or die sets 23 carried thereby. As will be understood by those of ordinary skill in this art, various forming operations, such as drawing, redrawing, scoring, etc., are performed on the workpiece as it is moved through the press by a belt by advancing the upper platen 21 toward the press base 22 with the tooling or die sets 23 cooperating for performing these various forming operations. No detail has been shown with regard to these operations or the tooling for performing them in this application inasmuch as they would be well known to those skilled in the art.

Still referring to FIGS. 1 and 1A, the conveyor system itself includes a drive drum 11 and a support arrangement 12 situated opposite each other with the endless belt 30 being disposed therearound.

The drive drum 11 is journaled on a shaft 11a and has teeth or cogs 11b about its periphery for engagement with the belt in order to impart driving movement thereto in known fashion. The engagement means illustrated are by way of example only and various combinations of configurations to ensure driving engagement between the belt and the drum could be employed. It will also be appreciated that shaft 11a is operatively connected to a suitable power source capable of imparting rotational force thereto in order to drive drum 11 and belt 30.

At the end of the conveyor system opposite drive drum 11 is a support arrangement 12 characterized by the utilization of a leaf spring 12a which has one end supported on a support 12b and with that support being longitudinally adjustable by means of the cylinder 12c and the bracket plate 12d. In this arrangement, the cylinder rod 12e is threaded on its projecting end as at 12f and freely received in a suitable bore in bracket 12d. A stop nut 12g is received on the threaded portion of rod 12e so that the position of support 12b and thus the leaf spring 12a relative to drive drum 11 can be precisely controlled.

In that regard, the leaf spring 12a itself may be moved either to the left or to the right of FIG. 1 of the drawings by activation of the cylinder 12c to extend or retract rod 12e which will move the sliding bracket plate 12d and the spring 12a as desired by either forcing it to the left of FIG. 1 to increase belt tension or releasing it to move to the right. In this way, compensation can be provided for any natural sag which might occur in the belt per se and proper tension can be easily established by proper positioning of stop nut 12g.

Figure 2:
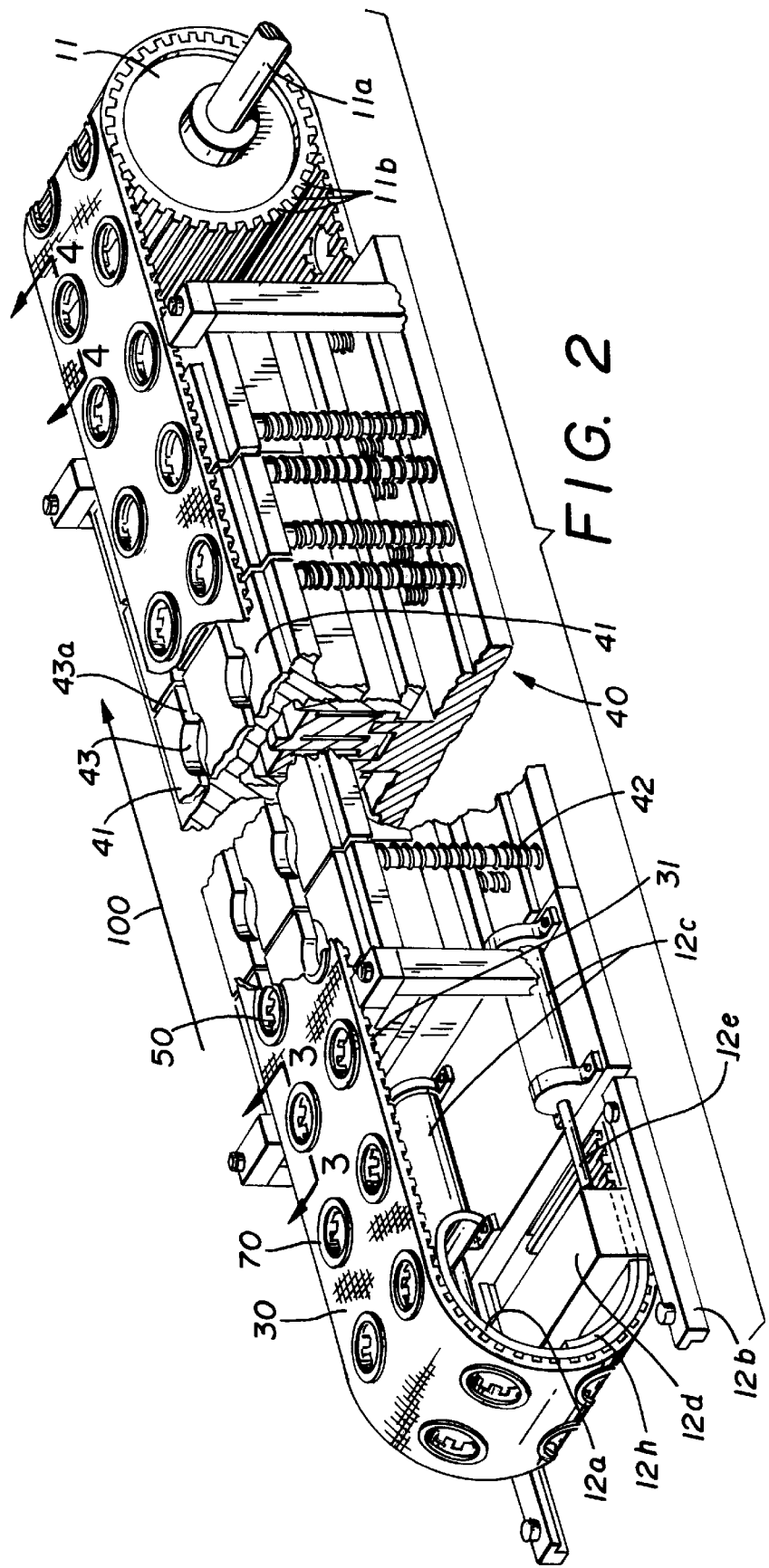
FIG. 2 is a perspective view partially broken away showing the improved system.

Referring to FIG. 2 of the drawings, it will be noted that the mounting member 12b for the leaf spring is illustrated as comprising two parallel plates which are mounted on a suitable support surface and which carry the sliding bracket plate 12d. This bracket plate 12d is engaged by opposed cylinders 12c,12c and the extending arms 12e,12e of the cylinders can move the bracket plate again to the left or right of FIG. 2 as previously mentioned. Also, as previously mentioned, lock nut 12g and cylinder 12c are provided for each bracket plate and in operation, of course, if it is desired to alter the position of the leaf spring, it is simply necessary to adjust these nuts. Further, to remove the belt 30, the cylinders can be retracted fully.

Finally, a second leaf 12h is juxtaposed over a portion of spring 12a to provide a dampening effect to the spring and minimize vibration in belt 30.

Still referring to FIG. 2 of the drawings, the belt 30 is shown mounted about the drive drum 11 and the leaf spring 12a. This figure also illustrates the driving means for the belt wherein the previously referred to teeth, lugs or cogs 11b of the drive drum 11 engage lips or ridges 31 of the belt 30 so that, as the drive drum 11 is rotated with the shaft 11a by a suitable source of power such as a motor (not shown), the lugs 11b will engage the ridges 31 and drive the belt.

Figure 10:
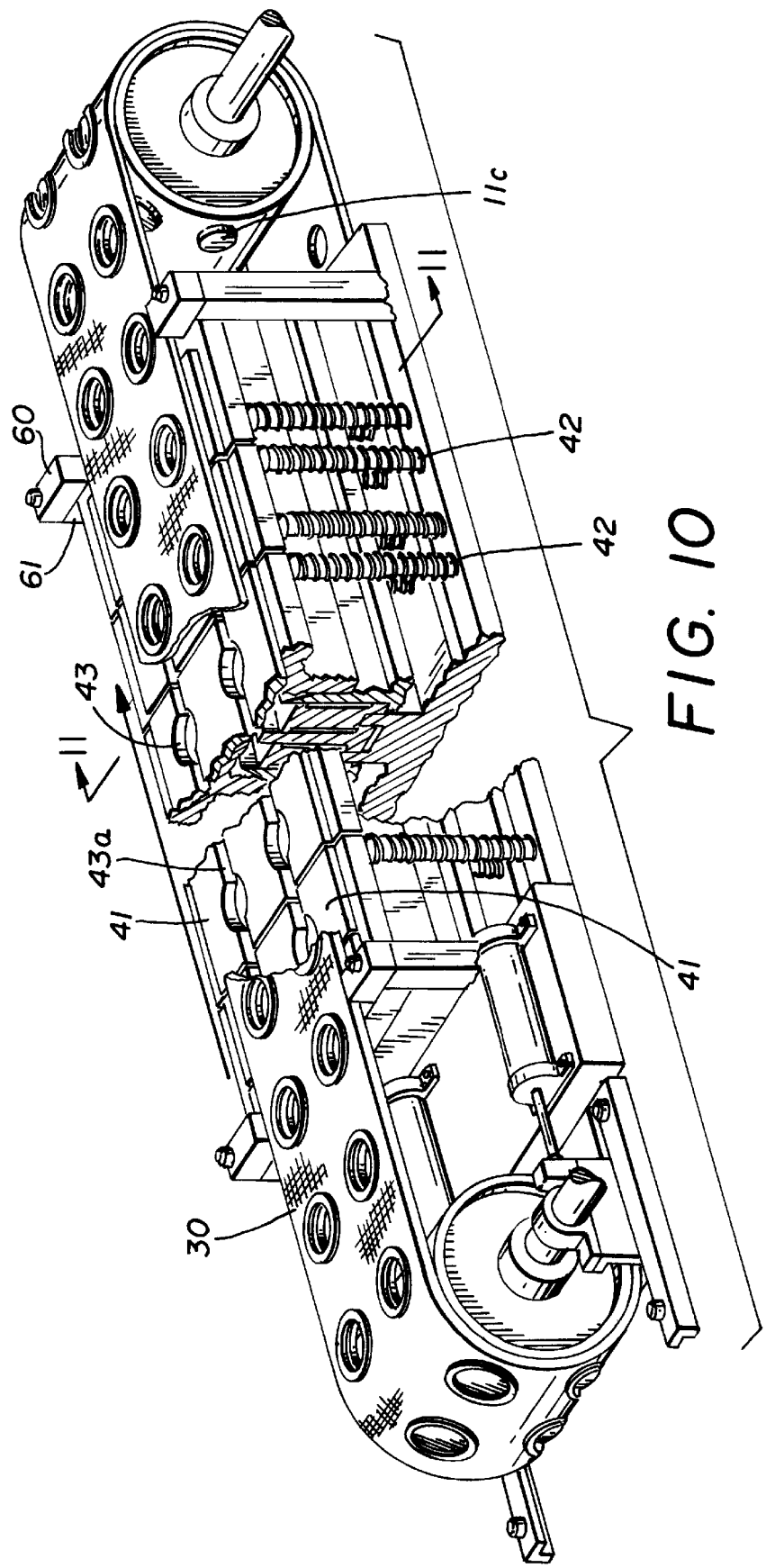
FIG. 10 is a perspective view partially broken away showing an alternative form of the invention.

Also, as shown in FIG. 10, the teeth, lugs or cogs 116 could be eliminated and the driving engagement can be accomplished by direct engagement of projections 11c with the apertures 50 in belt 30. In either case, when arranged as shown in FIGS. 1, 1A, 2 and 10, activation of drive drum 11 will cause the belt 30 to move through the press in the direction of arrow 100, stopping at intervals to allow the press to close and forming operations to be performed on the ends carried in the pockets 50 of the belt 30. As previously described, on each cycle of the press, the tooling 23 will descend to perform a forming operation following which, as the press opens, the belt will be indexed so as to present the ends to the next station. Also, as previously noted, the tooling movement will cause some depression of belt 30 which is controlled by leaf spring 12a.

As previously mentioned, with some end configurations, a taller end involves greater tool movement and, thus, potentially greater belt movement and stretching. It is desirable to avoid this and it has been found that, if the belt is initially positioned above a horizontal or neutral line, this can be avoided. Thus, if a given length belt 30 permits 1.0 inch movement or stretching and the forming operation requires 2.0 inches, both conditions can be accommodated by positioning the belt 1.0 inch above the horizontal or neutral line at the start.

Turning then to FIGS. 2 and 10 of the drawings, a support assembly 40 is illustrated as being disposed beneath the belt 30. This assembly includes a plurality of elongate sections or plates 41,41 which are supported on springs 42 with each section having a plurality of substantially semi-circular through apertures 43 interconnected by through channels 43a. It is intended that the support plates 41,41 and the springs 42 will support the belt, further avoiding the problem of sagging, while the apertures 43 will register with the apertures 50 in belt 30 to avoid interference with the forming tooling. It is also contemplated that the belt could actually be elevated above the horizontal to further compensate for sag and for the pressures encountered during the forming operation as will be described.

Figure 11:
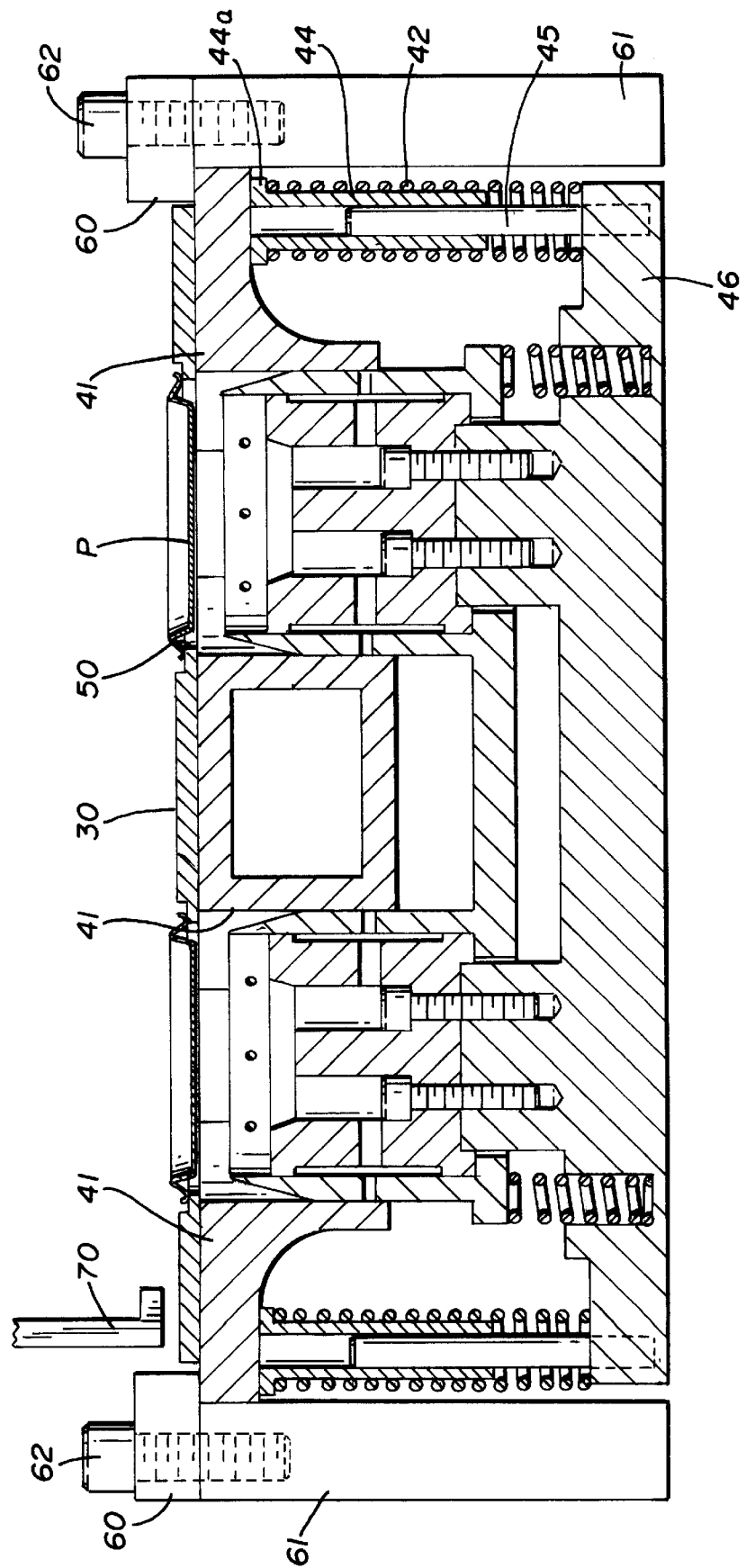
FIG. 11 is a sectional view taken along the line 11—11 of FIG. 10 showing the support apparatus in an elevated position.
Figure 12:
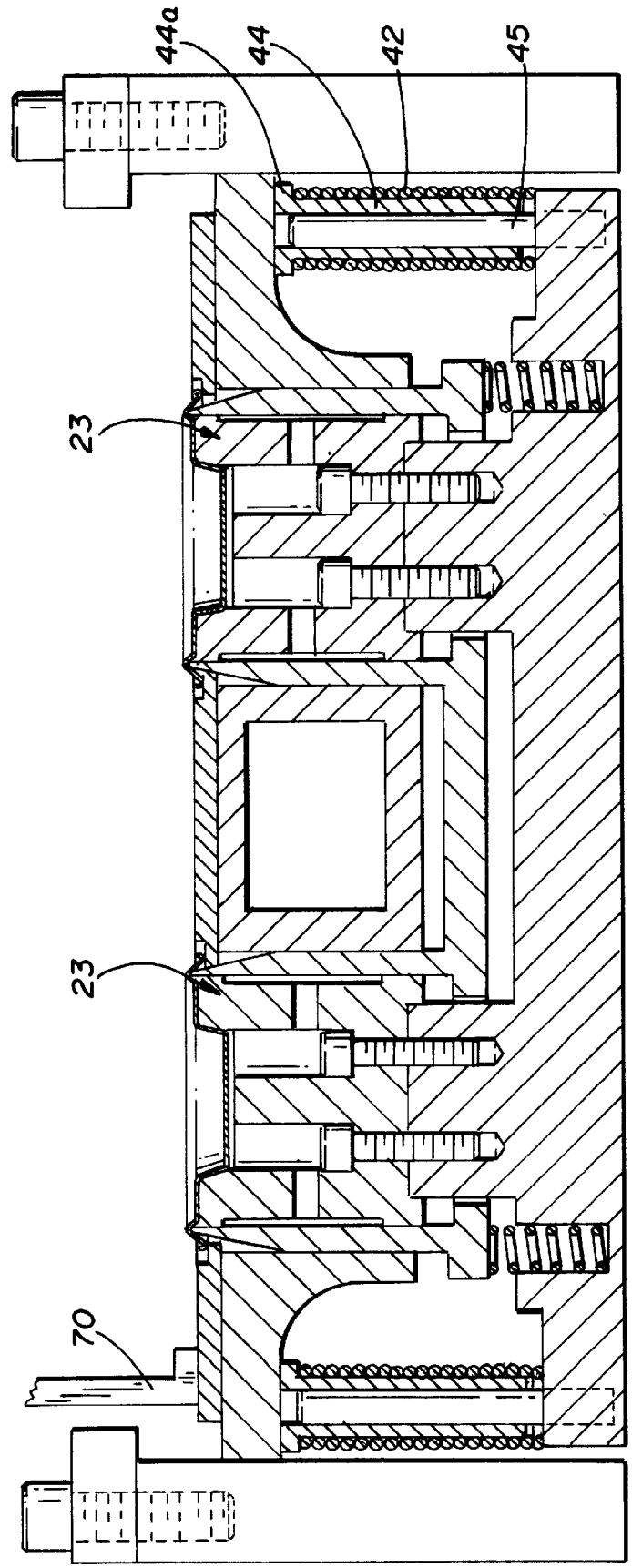
FIG. 12 is a view similar to FIG. 11 showing the support apparatus in a lowered position.

In this regard, reference is had to FIGS. 11 and 12 of the drawings wherein it will be seen that springs 42 are disposed about sleeves 44 which are, in turn, telescoped over rods 45. The top, flared ends 44a of sleeves 44 underlie the plates 41 which support the individual plates 41 upon which the belt 30 rides and serve as a stop for the top end of each spring. The opposed ends of the springs rest on base 46. In FIG. 11, the plates 46 are shown in the elevated position, while FIG. 12 shows the retracted position. Positioning of plates 41 will, of course, control the level of belt 30. Also, the springs 43 will control the belt elevation during the forming operation as required. In that regard, the springs 43 urge the plates 41 upward until they abut stop 60. This will position belt 30 at its predetermined elevated level. It will be noted that stop 60 is held in place on post 61 by bolt 62.

Also, referring to FIGS. 1, 1A 10 and 11, it will be noted that a pusher 70 is carried by upper platen 21 so that, as the platen closes and the tooling advances into engagement with the workpiece, the pusher 70 will contact belt 30 and force belt 30 and plates 41 downwardly overcoming the springs 42. This will permit the belt 30 to move below the horizontal or neutral line the requisite distance. The entire belt will be moved this distance so as to avoid having the belt out of pitch at any station, thus insuring proper alignment of the parts with the tooling. Retraction of platen 21 permits the springs 42 to return the plates and the belt to the starting position.

As noted, the apertures 43 in the support plate 40 are intended to be aligned so as to underlie the apertures or pockets 50 and the belt 30 (see FIGS. 2 and 10–12) as the belt is indexed so that no interference will be encountered with regard to the tooling 23 of the press 20.

It should be noted that the improved apparatus is fully operational with or without the support apparatus 40. That is, in many circumstances, the leaf spring support arrangement 12 will be adequate to provide the necessary support and positioning for the belt 30 during the forming operation. However, if a particularly deep end is to be formed, the support plate 40 can be utilized to overcome the problems created by unacceptable movement below the horizontal during forming. Thus, adjusting the plates 46 of support apparatus 40 upwardly so that the belt 30 is actually normally positioned above the horizontal has the result that during the forming operation the amount of depression below the horizontal is minimized, permitting, as previously noted, increased tool travel without increased belt stretching. It should also be noted that the expedient of support apparatus 40 could be used with conventional belt systems wherein a drive and an idler roll are used.

Figure 3:
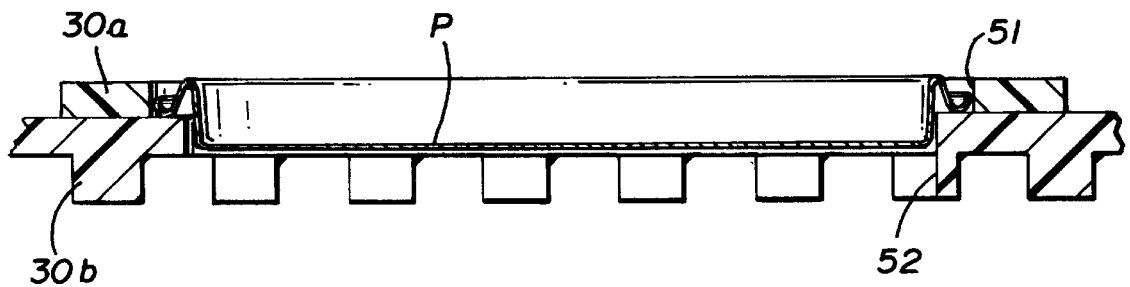
FIG. 3 is a sectional view taken along the line 3—3 of FIG. 2.
Figure 4:
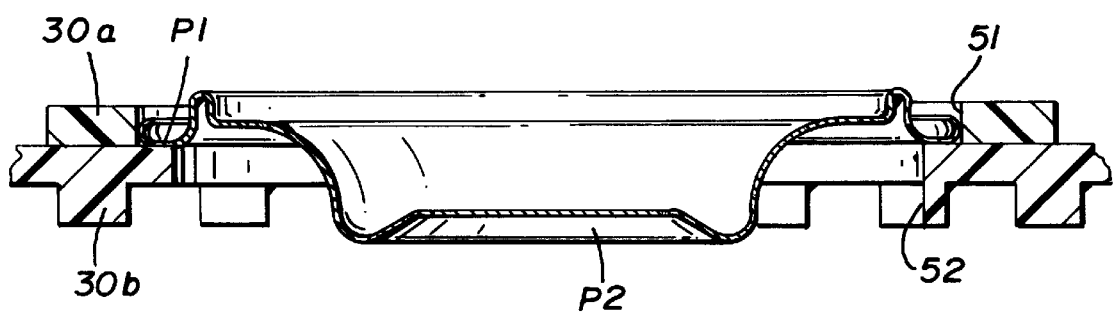
FIG. 4 is a sectional view taken along the line 4—4 of FIG. 2.
Figure 5:
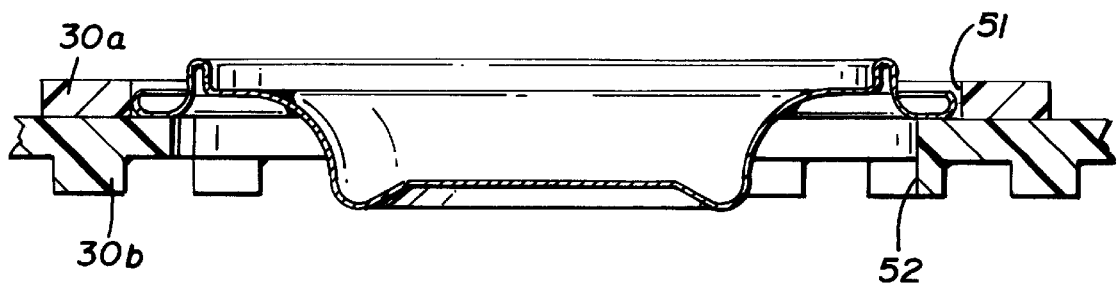
FIG. 5 is a sectional view taken along the line 5—5 of FIG. 2.
Figure 6:
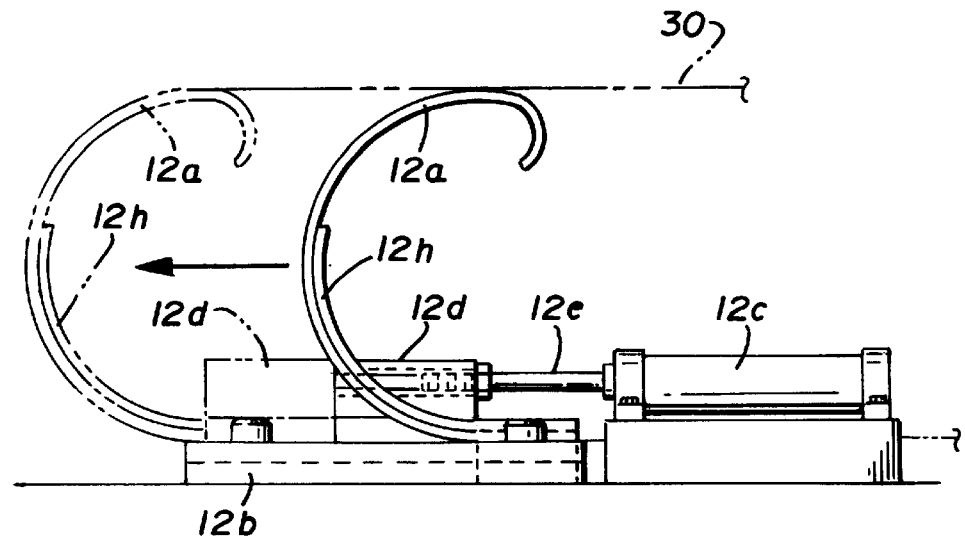
FIG. 6 is a partial elevational view illustrating the adjustment feature of the improved system.
Figure 7:
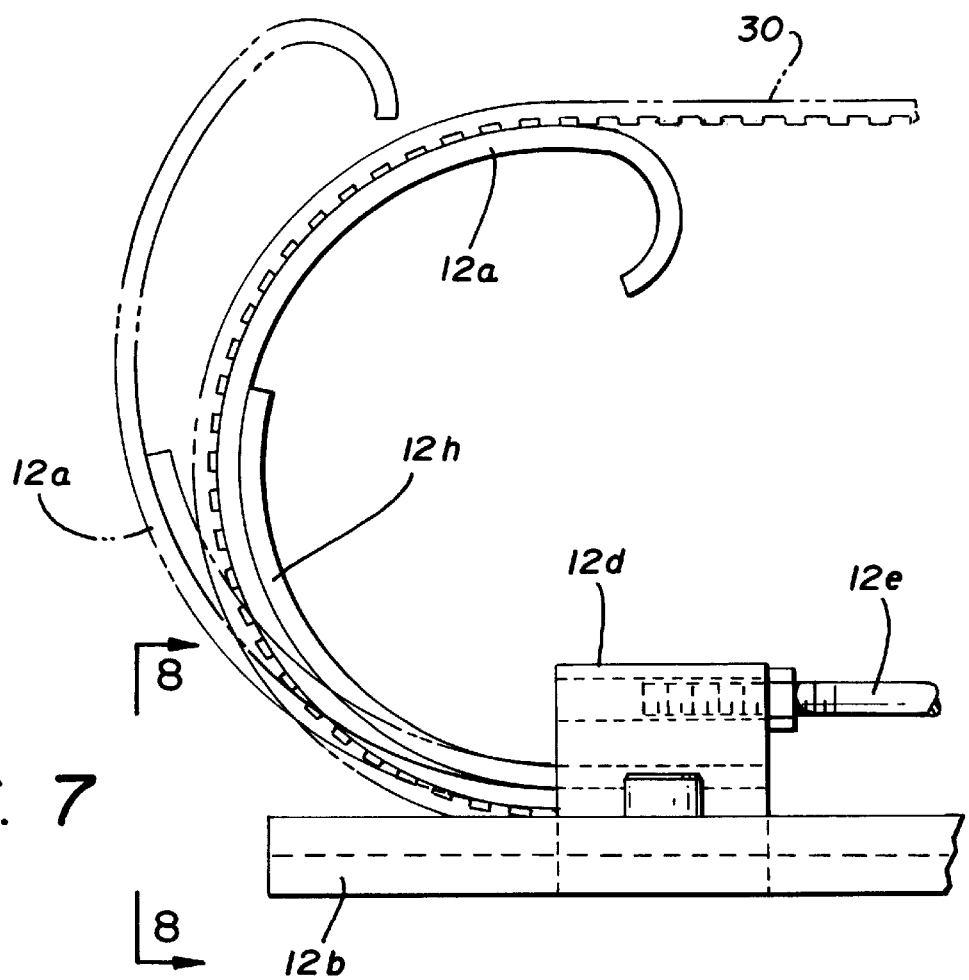
FIG. 7 is a partial elevational view showing the operation of the spring support.
Figure 8:
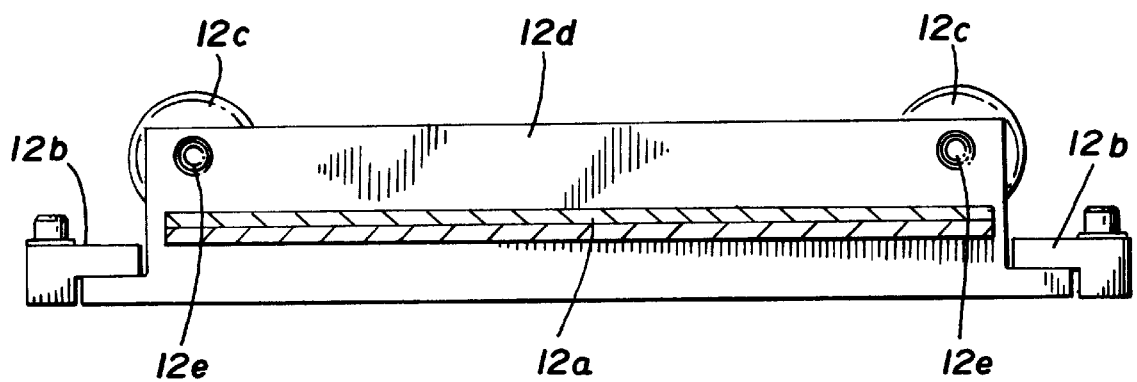
FIG. 8 is a sectional view taken along the line 7—7 of FIG. 8.
Figure 9:
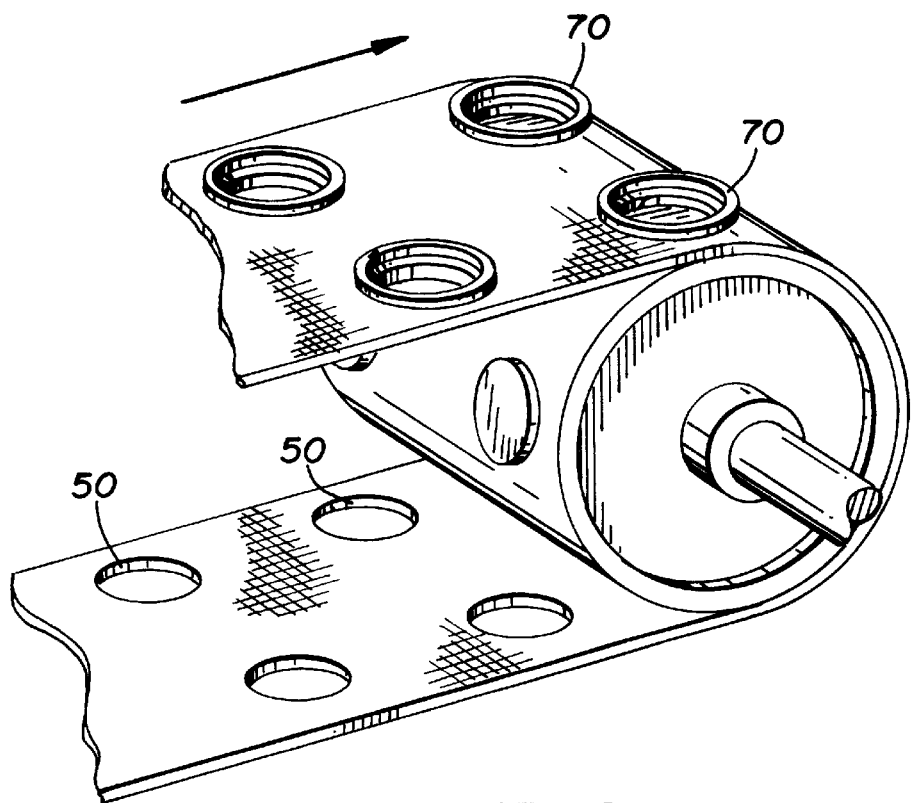
FIG. 9 is a partial perspective view showing the drive means for the system.

Reference is next made to FIGS. 3 through 5 of the drawings wherein it will be seen that the pockets 50 of the belt 30 may be constructed with a unique configuration. In that regard the pockets 50 have a first diameter 51 extending axially downward from the top surface of belt 30 and then a second, smaller diameter 52 extending to the bottom surface thereof so as to form a shelf or ledge disposed beneath the top surface of belt 30. This can be accomplished by providing a laminated belt with the pockets of the layers 30a,30b cut so as to have different diameters, as shown in FIGS. 3 and 4, or by simply cutting the pockets in this fashion in a single thickness belt as shown in FIGS. 1, 1A and 5.

It can also be accomplished by providing belt pockets of a given diameter throughout their axial length and inserting metal or plastic inserts 70 having the desired, stepped configuration as shown in FIG. 2. The advantage of any of these arrangements is that no extraneous lip or flange about the top of the workpiece is required to support the work product P in the pocket 32 and furthermore, in view of some recent developments in end geometry, this type of pocket will accommodate a much deeper end as can be seen in FIG. 4 of the drawings. In that regard the seaming flange of the product $P_1$ can rest on the shoulder provided by the intersection of the larger diameter opening 51 and the smaller diameter opening 52, and the bottom of the product $P_2$ can extend beneath the belt without interference. In this way, a variety of end configurations can be readily accommodated.

It will be readily apparent that this unique pocket configuration can be employed regardless of the belt support system. That is, it could be used with the prior art two drum system or the present leaf spring system and with or without the support plate illustrated and described herein.

While a full and complete description of the invention has been set forth in accordance with the dictates of the patent statutes, it should be understood that modifications can be resorted to without departing from the spirit hereof or the scope of the appended claims.

Thus, it should be noted that while a leaf spring 12a has been shown and described, much the same effect could be achieved by utilizing a coil spring, air spring or similar device acting on an arcuate support plate which engages the belt.

What is claimed is:

1. Apparatus for moving articles on an endless conveyor belt, comprising:
   (a) at least one pair of rigid support plates disposed beneath the belt and normally in contact with and supporting the belt;
   (b) resilient means underlying said support plates and engaging the same to resiliently support the belt;
   (c) said conveyor belt being disposed within a press having an upper platen and a base;
   (d) said upper platen and said base carrying forming tooling;
   (e) said upper platen being movable toward and away from said base; and
   (f) means carried by said upper platen for engaging and moving said belt from a position above said neutral plane to a position below said neutral plane against the force of said resilient means upon movement of said upper platen toward said base.

2. The apparatus of claim 1 wherein the belt is movable and has a series of through apertures therein; and each said pair of support plates form a through aperture selectively underlying said through apertures of the belt as the belt is moved.

3. The apparatus of claim 1 wherein said resilient means comprise a series of springs supporting said plates.

4. The apparatus of claim 3 wherein a plurality of elongate rods are disposed beneath said plates; said springs are telescoped over said rods; an elongate sleeve is telescoped over each said springs; and one end of each said elongate sleeves is in engagement with said plates.

5. The apparatus of claim 1 wherein said belt is suspended between opposed drive and support means with the portion of said belt therebetween normally lying in a neutral plane; and said resilient means normally urging said portion of said belt above said neutral plane.

6. The apparatus of claim 1 wherein said last mentioned means include at least one pusher carried by said upper platen; and said pusher is movable into contact with the belt upon movement of said upper platen toward said base.

7. Apparatus for moving articles on an endless conveyor belt, comprising:
   (a) at least one pair of rigid support plates disposed beneath the belt and normally in contact therewith;
   (b) resilient means underlying said support plates and engaging the same to resiliently support the belt;
   (c) said resilient means comprising a series of springs supporting said plates;
   (d) a plurality of elongate rods disposed beneath said plates;
   (e) said springs being telescoped over said rods;
   (f) an elongate sleeve telescoped over each said spring; and
   (g) one end of each said elongate sleeves is in engagement with said plates.

8. The apparatus of claim 7 wherein the belt is movable and has a series of through apertures therein; and each said pair of support plates form a through aperture selectively underlying said through apertures of the belt as the belt is moved.

9. The apparatus of claim 7 wherein said belt is suspended between opposed drive and support means with the portion of said belt therebetween normally lying in a neutral plane; and said resilient means normally urging said portion of said belt above said neutral plane.

10. The apparatus of claim 9 wherein said conveyor belt is disposed within a press having an upper platen and a base; said upper platen and said base carrying forming tooling; said upper platen being movable toward and away from said base; and means carried by said upper platen for moving said belt from a position above said neutral plane to a position below said neutral plane against the force of said resilient means upon movement of said upper platen toward said base.

11. The apparatus of claim 10 wherein said last mentioned means include at least one pusher carried by said upper platen; and said pusher is movable into contact with the belt upon movement of said upper platen toward said base.

* * * * *